No. 746,494. PATENTED DEC. 8, 1903.
J. W. GLAHOLM & G. T. KENT.
PARALLEL RULER.
APPLICATION FILED MAY 29, 1903.
NO MODEL.
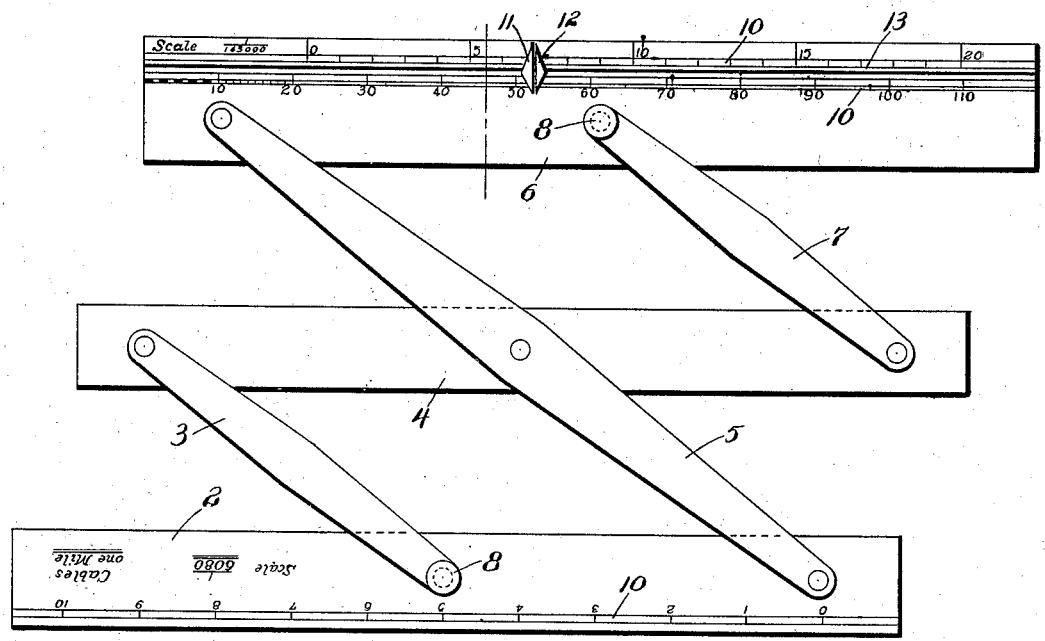
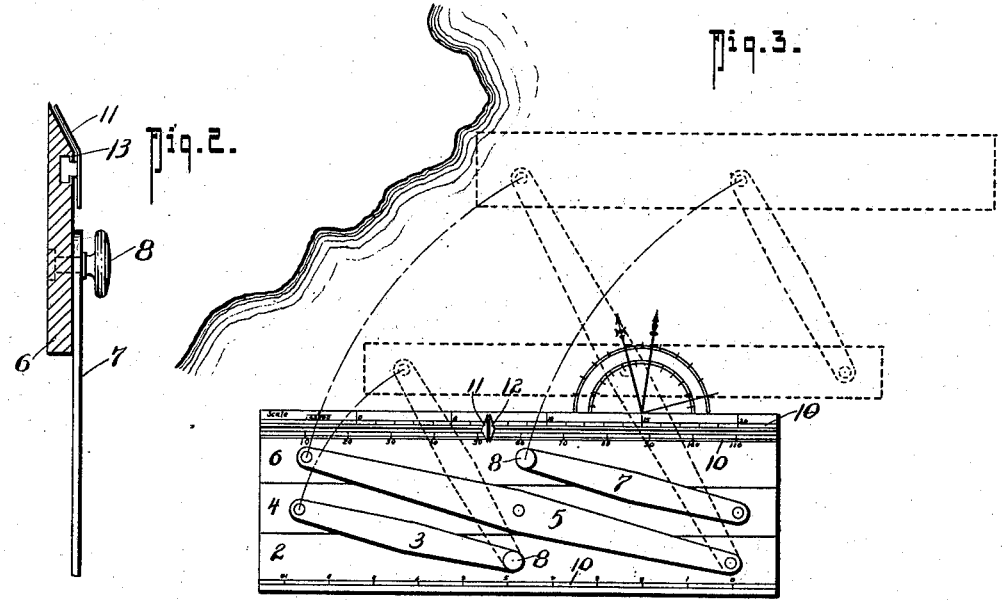
WITNESSES:
F. C. Gibson
John T. Schrott
INVENTORS
John William Glaholm.
George Turner Kent.
BY
Fred G. Dieterich
ATTORNEY No. 746,494. Patented December 8, 1903.

UNITED STATES PATENT OFFICE.

JOHN WILLIAM GLAHOLM AND GEORGE TURNER KENT, OF NANAIMO, CANADA.

PARALLEL-RULER.

SPECIFICATION forming part of Letters Patent No. 746,494, dated December 8, 1903.

Application filed May 29, 1903. Serial No. 159,271. (No model.)

*To all whom it may concern:*

Be it known that we, JOHN WILLIAM GLAHOLM and GEORGE TURNER KENT, citizens of the Dominion of Canada, residing at the city of Nanaimo, in the Province of British Columbia, Canada, have invented a new and useful Improvement in Parallel-Rulers, of which the following is a specification.

Our invention relates to a parallel-ruler of that class wherein two or more straight edges are connected together by parallel and equal links; and our object has been to provide one that shall have a more extended range and more convenient means for rapid manipulation than what has been furnished hitherto and that without any elaboration of its construction, but rather a simplification thereof.

A further object has been to provide a means on the ruler itself for measuring or laying off distances.

In nautical work, for which our ruler has been especially designed, it affords a ready means for the determination of a distance run on a certain course without the requirement of reference to the border-scale with the customary dividers, the pricking off with which is both troublesome and inconvenient and a frequent source of error.

The particular construction and the application of our improved ruler is fully described in the following specification, reference being made to the drawings which accompany it.

Figure 1 is a general view in plan of the ruler; Fig. 2, a cross-section through one of the straight edges, and Fig. 3 an illustration of the application of the use of the ruler to a course-measurement on a chart.

As is clearly shown on the drawings, the ruler consists, essentially, of three similar members 2, 4, and 6, forming the ruler elements of the device, and these are connected together and the parallelism of their edges maintained by the link members 3, 5, and 7. 3 and 7 are of equal length and pivotally connected from toward the end of the inner ruler member 4 to mid-length of each of the outer ruler members 2 and 6. The center link member 5 is exactly double the length of the others and is pivotally mounted at its mid-length to the middle of the inner member 4. The outer ruler members 2 and 6 are thus each connected and constrained to move parallel with the middle member 4, as 2 is connected to it by 3 and the half of 5 and 6 by 7 and the other half of 5, which are all equal and parallel. One of these members 5 being common in both and forming a pivotal connection between the outer ruler members 2 and 6, the three members will move simultaneously and maintain parallelism one with the other. The advantage of this construction in enabling an extended reach with only one long link member will be evident to anyone having any experience with such rulers, particularly in laying off a course on charts, as when a ruler of ordinary construction and length is used the reach from the compass-rose must be made by a series of steps, with liability of error due to slip on the paper, or if the longer links are used in one of ordinary construction to obtain the greater reach the rulers must of necessity be proportionately longer, and the article is cumbersome and awkward to use. If, again, it is attempted to provide the extended reach by linking the outer ruler members to the inner one, each by two independent links, the links do not move simultaneously, but one pair will move to their extent before the other pair extend, and the movement is lacking the smoothness and uniformity of our construction and is, besides, complicated, cumbersome, and on account of the number of joints not sufficiently rigid in maintaining its parallelism. To facilitate handling, we provide a small knob 8 on the pivot in the center of the two outer rulers by which the ruler may be moved and may be lifted slightly to free it from paper-friction in opening.

We have referred to the link 5 as being equally divided and the links 3 and 7 as equal to one another and to the half of 5, and such would be the rational and better mode of construction; but it is obvious that the parts of 5 may be unequal and parallelism be maintained if the other links 3 and 7 are each equal in length to the portion of 5 which is connected to the outer ruler to which 3 and 7 are respectively connected.

The secondary feature in our invention consists in the combination, with the ruler, of a scale or scales 10 along the edges of the outer ruler members, such scales being adapted to the requirement of its use. Thus in the one which we have designed for nautical requirements the scales are cable lengths for harbor-charts, miles for coast-charts, and a smaller scale for the larger or deep-water charts. The scales are further provided with indicators 11 12, slidable in grooves 13, extending from end to end parallel with the edge of the ruler. The indicators will be found convenient not only to convey the scale-measurement to the edge of the ruler, but also to transfer a scale-measurement on a certain course from the compass-rose to any desired part of the chart, thus avoiding the necessity for pricking off with dividers from the border-scales of the chart. The indicators are preferably made with the points on their contiguous edges.

Although we have throughout described our ruler in its application to nautical purposes to meet the requirements of which it was designed, we do not desire to be confined to such, as the scales may be changed to suit other uses without departing from the spirit of our invention.

What we therefore claim as our invention, and desire to be protected in by Letters Patent, is—

1. A parallel-ruler having three ruler members, a link member pivotally connecting the three together, and link members parallel to the first-named connecting-link and linking each outer ruler member to the inner one so that the three ruler members may be constrained to move together and have their parallelism maintained.

2. In a parallel-ruler; the ruler members 2, 4 and 6, the link member 5 pivotally connected to 2, 4 and 6, the link member 3 pivotally connected to 2 and 4 and equal in length to the portion of 5 connected to the same, and the link member 7 pivotally connected to 4 and 6 and equal in length to the portion of 5 connected to these members.

3. In a parallel-ruler, a series of rulers of equal thickness, disposed in the same horizontal plane, the outer ones of said rulers having graduations thereon, one of said rulers having T-shaped grooves, pointers having T-shaped connections for coöperating with said groove, a link member connecting all of said rulers to each other, supplemental link members for connecting the outer rulers with the inner ruler, the said link members all being so arranged as to permit the rulers to move together always maintaining the parallel relation to each other, for the purposes specified.

4. In a parallel-ruler having three rulers of equal thickness and length disposed in the same horizontal plane, a link member connecting the end of one of the outer rulers to the opposite end of the other outer ruler and to the middle of the intermediate ruler, supplemental link members arranged parallel to the first-mentioned link member, and respectively connecting one end of the intermediate ruler to the respectively middle portions of the outer rulers for the purposes specified.

5. A parallel-ruler having three ruler members of an equal length, a link member pivotally connecting one end each of two of the rulers and the middle of the third ruler, link members parallel to the first-named link and respectively connecting one end of the intermediate ruler to the other two rulers for the purposes specified.

6. In a parallel-ruler, a series of rulers of equal thickness disposed in the same horizontal plane and of the same length, the outer ones of said rulers having graduations thereon, one of said rulers having T-shaped grooves, a pointer coöperating therewith, a link member connecting the opposite ends of the outer rulers and the middle portion of the intermediate ruler, supplemental link members connecting the outer rulers with the intermediate ruler, the said links all being so arranged as to permit the rulers to move together always maintaining the parallel relation to each other, and the whole being so constructed as to permit the rulers to be folded up against each other into a rectangular form, for the purposes specified.

In testimony whereof we have signed our names to this specification in the presence of two subscribing witnesses.

JOHN WILLIAM GLAHOLM.
GEORGE TURNER KENT.

In presence of—
I. H. GOOD,
E. W. CASE.